(12) United States Patent
Sheridan et al.

(10) Patent No.: US 9,194,255 B2
(45) Date of Patent: Nov. 24, 2015

(54) OIL BAFFLE FOR GAS TURBINE FAN DRIVE GEAR SYSTEM

(71) Applicant: United Technologies Corporation, Hartford, CT (US)

(72) Inventors: William G. Sheridan, Southington, CT (US); Michael E. McCune, Colchester, CT (US)

(73) Assignee: United Technologies Corporation, Hartford, CT (US)

( * ) Notice: Subject to any disclaimer, the term of this patent is extended or adjusted under 35 U.S.C. 154(b) by 46 days.

(21) Appl. No.: 14/173,874

(22) Filed: Feb. 6, 2014

(65) Prior Publication Data

US 2014/0154054 A1    Jun. 5, 2014

Related U.S. Application Data

(60) Continuation-in-part of application No. 13/861,602, filed on Apr. 12, 2013, now Pat. No. 8,898,900, which is a continuation of application No. 13/346,790, filed on Jan. 10, 2012, now Pat. No. 8,640,336, which is a (Continued)

(51) Int. Cl.
*F01D 25/18* (2006.01)
*F02C 7/36* (2006.01)
*F16H 57/04* (2010.01)

(52) U.S. Cl.
CPC . *F01D 25/18* (2013.01); *F02C 7/36* (2013.01); *F16H 57/0423* (2013.01); *F16H 57/0486* (2013.01); *F05D 2230/60* (2013.01); *F05D 2260/40311* (2013.01); *Y02T 50/671* (2013.01); *Y10T 29/4932* (2015.01)

(58) Field of Classification Search
CPC ....... F01D 25/164; F01D 25/18; F01D 15/12; F02C 7/36; F02C 7/32; F02C 7/20; F03D 11/02
USPC ......... 415/122.1, 124.1, 229; 416/170 R, 160
See application file for complete search history.

(56) References Cited

U.S. PATENT DOCUMENTS

| 2,591,743 A | 4/1952 | Thompson |
| 3,650,353 A | 3/1972 | Abbott |

(Continued)

FOREIGN PATENT DOCUMENTS

| DE | 3410977 | 9/1985 |
| EP | 1482210 | 12/2004 |

(Continued)

OTHER PUBLICATIONS

Extended European Search Report for application No. EP 07 25 2647, dated Jan. 25, 2011.

(Continued)

*Primary Examiner* — Edward Look
*Assistant Examiner* — Christopher J Hargitt
(74) *Attorney, Agent, or Firm* — Carlson, Gaskey & Olds, PC

(57) ABSTRACT

A turbine engine comprises compressor and turbine sections. An epicyclic gear train includes a carrier, a sun gear and intermediate gears arranged about and intermeshing with the sun gear. The intermediate gears are supported by the carrier. A baffle includes a lubrication passage near at least one of the sun gear and intermediate gears for directing a lubricant on at least one of the sun gear and intermediate gears. A method of designing a turbine engine is also disclosed.

30 Claims, 6 Drawing Sheets

Related U.S. Application Data continuation of application No. 12/718,436, filed on Mar. 5, 2010, now Pat. No. 8,276,275, which is a division of application No. 11/481,112, filed on Jul. 5, 2006, now Pat. No. 7,704,178.

(56) References Cited

U.S. PATENT DOCUMENTS

| | | | |
|---|---|---|---|
| 3,853,432 A | 12/1974 | Cronstedt | |
| 4,271,928 A | 6/1981 | Northern | |
| 4,378,711 A | 4/1983 | Daniel | |
| 4,827,712 A | 5/1989 | Coplin | |
| 4,914,904 A | 4/1990 | Parnes | |
| 5,391,125 A * | 2/1995 | Turra et al. | 475/346 |
| 5,433,674 A * | 7/1995 | Sheridan et al. | 475/346 |
| 5,466,198 A | 11/1995 | McKibbin et al. | |
| 5,472,383 A * | 12/1995 | McKibbin | 475/159 |
| 6,158,210 A | 12/2000 | Orlando | |
| 6,223,616 B1 * | 5/2001 | Sheridan | 74/468 |
| 6,905,303 B2 | 6/2005 | Liu et al. | |
| 7,011,599 B2 | 3/2006 | Becquerelle et al. | |
| 7,033,301 B2 | 4/2006 | Kimes | |
| 7,104,918 B2 | 9/2006 | Mitrovic | |
| 7,112,157 B2 | 9/2006 | Uebbing | |
| 7,214,160 B2 | 5/2007 | Illerhaus | |
| 7,490,460 B2 | 2/2009 | Moniz et al. | |
| 7,704,178 B2 | 4/2010 | Sheridan et al. | |
| 7,883,439 B2 | 2/2011 | Sheridan et al. | |
| 8,276,275 B2 | 10/2012 | Sheridan et al. | |
| 2005/0026744 A1 | 2/2005 | Illerhauset et al. | |
| 2009/0111639 A1 | 4/2009 | Klingels | |

FOREIGN PATENT DOCUMENTS

| | | |
|---|---|---|
| EP | 1783344 | 12/2009 |
| EP | 2559913 | 2/2013 |
| JP | 6-1889 | 1/1994 |
| JP | 2001-208146 | 8/2001 |
| JP | 2005-163666 | 6/2005 |
| JP | 2005-207472 | 8/2005 |
| WO | 2007054066 | 5/2007 |

OTHER PUBLICATIONS

European Search Report for European Patent Application No. 12180834.9 Completed Dec. 7, 2012.

\* cited by examiner

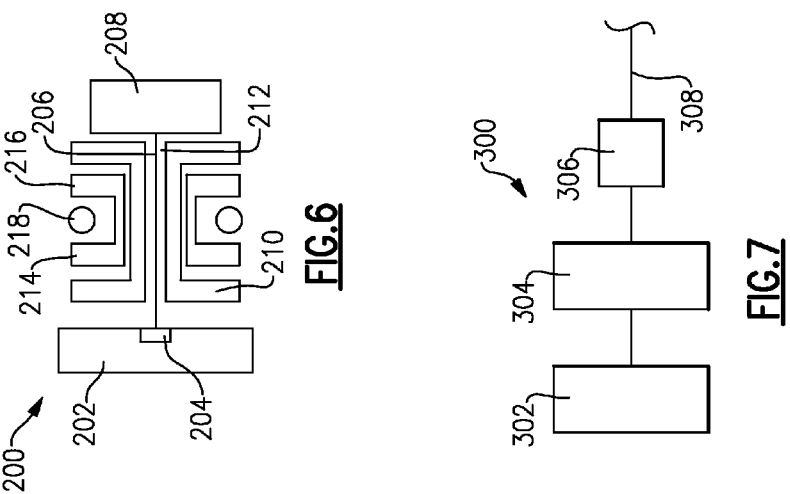
FIG.6
FIG.7
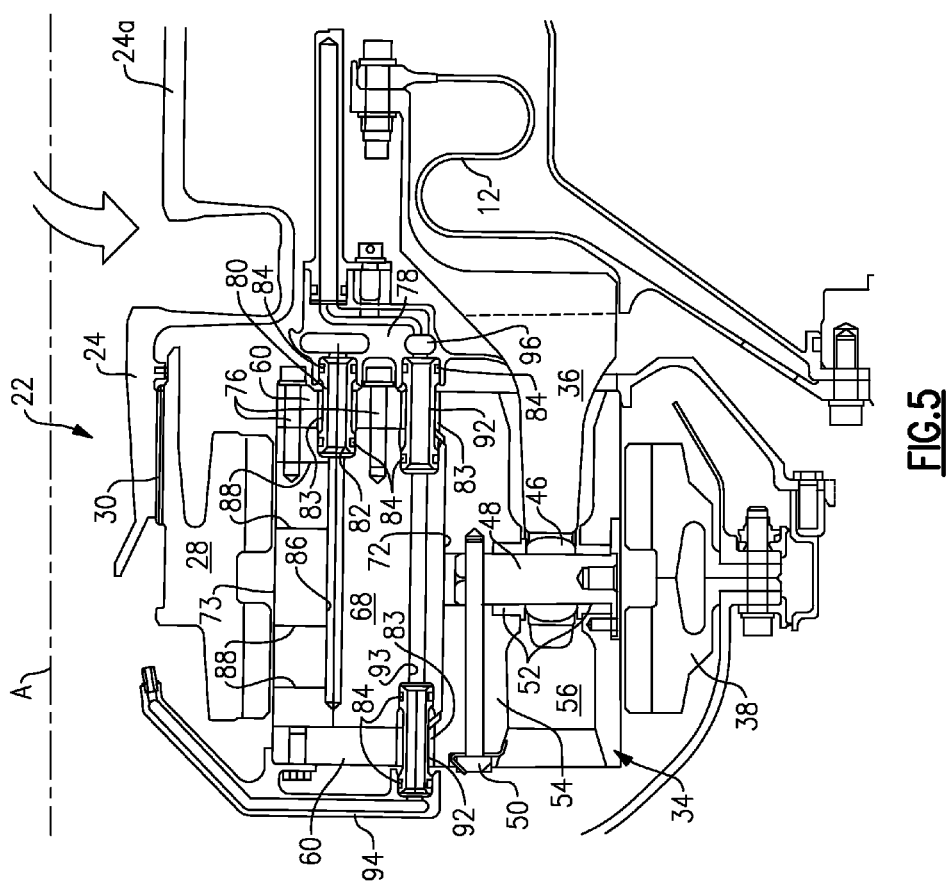
FIG.5

US 9,194,255 B2

OIL BAFFLE FOR GAS TURBINE FAN DRIVE GEAR SYSTEM

CROSS-REFERENCE TO RELATED APPLICATION

This application is a continuation-in-part of U.S. patent application Ser. No. 13/861,602, filed Apr. 12, 2013, which is a continuation of U.S. patent application Ser. No. 13/346,790, filed on 10 Jan. 2012. U.S. patent application Ser. No. 13/346,790 is a continuation of U.S. patent application Ser. No. 12/718,436, filed on 5 Mar. 2010, now U.S. Pat. No. 8,276,275, issued 2 Oct. 2012 which is a divisional of U.S. patent application Ser. No. 11/481,112, filed 5 Jul. 2006, now U.S. Pat. No. 7,704,178, issued 27 Apr. 2010.

BACKGROUND OF THE INVENTION

This invention relates to an oil baffle arrangement for use in an epicyclic gear train employed to drive a fan.

Gas turbine engines typically employ an epicyclic gear train connected to a turbine section of the engine, which is used to drive the fan. In a typical epicyclic gear train, a sun gear receives rotational input from a turbine shaft through a compressor shaft. A carrier supports intermediate gears that surround and mesh with the sun gear. A ring gear surrounds and meshes with the intermediate gears. In arrangements in which the carrier is fixed against rotation, the intermediate gears are referred to as "star" gears and the ring gear is coupled to an output shaft that supports the fan. In arrangements in which the ring gear is fixed against rotation, the intermediate gears are referred to as "planetary" gears and the carrier is coupled to the output shaft that supports the fan.

The epicyclic gear train gears must receive adequate lubrication during operation of the turbine engine. To this end, the carrier includes oil spray bars arranged between the intermediate gears and the sun gear to spray oil directly on those gears. Separate oil baffles, which may be integral with or separate from the carrier, are arranged between the intermediate gears to collect the sprayed oil and retain it in the area of the intermediate gears for prolonged lubrication before the oil is collected in a lubricant gutter associated with the ring gear.

Prior art carrier arrangements have required multiple components and complicated assembly in order to accommodate the oil baffles. For example, one or both of the side walls of the carrier must be assembled around the intermediate gears resulting in a multi-piece carrier. Furthermore, separate oil spray bars and oil baffles complicate assembly and increase cost. What is needed is a simplified oil baffle and spray bar arrangement that enables a simpler and less expensive carrier design.

SUMMARY OF THE INVENTION

In a featured embodiment, a turbine engine comprises compressor and turbine sections. An epicyclic gear train includes a carrier, a sun gear and intermediate gears arranged about and intermeshing with the sun gear. The intermediate gears are supported by the carrier. A baffle includes a lubrication passage near at least one of the sun gear and intermediate gears for directing a lubricant on at least one of the sun gear and intermediate gears.

In another embodiment according to the previous embodiment, a ring gear intermeshes with the intermediate gears and an output shaft interconnected to the ring gear, and an input shaft interconnected to the sun gear.

In another embodiment according to any of the previous embodiments, the carrier is fixed relative to a housing. The output shaft drives a fan. The input shaft supports a compressor hub having compressor blades.

In another embodiment according to any of the previous embodiments, there are three turbine rotors in the turbine section, with a fan drive turbine driving the fan through the input shaft, and two other turbine rotors driving compressor rotors.

In another embodiment according to any of the previous embodiments, the carrier is fixed relative to a housing. The output shaft drives a compressor hub, and a fan at a common speed, and the input shaft is driven by a turbine rotor.

In another embodiment according to any of the previous embodiments, there are two turbine rotors, with the first turbine rotor driving a second compressor hub, and a lower pressure turbine rotor driving the compressor hub and the fan through the input shaft.

In another embodiment according to any of the previous embodiments, the carrier is fixed to a housing. The output shaft drives a fan. The input shaft rotates with a compressor hub.

In another embodiment according to any of the previous embodiments, the carrier includes spaced apart walls with circumferentially spaced mounts interconnecting the walls. The mounts provide circumferentially spaced apart apertures between the mounts at an outer circumference of the carrier. The intermediate gears extend through the apertures to intermesh with a ring gear.

In another embodiment according to any of the previous embodiments, a housing supports a torque frame that is secured to the mounts.

In another embodiment according to any of the previous embodiments, the lubrication passage includes a primary passage extending laterally between the walls and first and second passages in communication with the primary passage and respectively terminating near the sun gear and intermediate gears.

In another embodiment according to any of the previous embodiments, a tube extends through a hole in one of the walls, the tube in communication with the primary passage.

In another embodiment according to any of the previous embodiments, there are three turbine rotors in the turbine section, with a fan drive turbine driving a fan through the input shaft, and two other turbine rotors driving compressor rotors.

In another embodiment according to any of the previous embodiments, the carrier is fixed relative to a housing. The output shaft drives a compressor hub and a fan at a common speed. The input shaft is driven by a turbine rotor.

In another embodiment according to any of the previous embodiments, the carrier is fixed to a housing. The output shaft drives a fan. The input shaft rotates with a compressor hub.

In another embodiment according to any of the previous embodiments, there are two turbine rotors in the turbine section with a first turbine rotor driving a second compressor hub, and a lower pressure turbine rotor driving the compressor hub and the input shaft.

In another featured embodiment, a turbine engine comprises compressor and turbine sections. An epicyclic gear train includes a carrier. A sun gear and intermediate gears are arranged about and intermesh with the sun gear. The intermediate gears are supported by the carrier. A baffle includes a lubrication passage near at least one of the sun gear and intermediate gears for directing a lubricant on at least one of the sun gear and intermediate gears. A spray bar is external to the carrier and in communication with the lubrication passage, and terminates near the sun gear for directing lubricant on the sun gear.

In another embodiment according to the previous embodiment, a ring gear intermeshes with the intermediate gears and an output shaft interconnected to the ring gear, and an input shaft interconnected to the sun gear.

In another embodiment according to any of the previous embodiments, the carrier is fixed relative to a housing. The output shaft drives a fan. The input shaft supports a compressor hub having compressor blades.

In another embodiment according to any of the previous embodiments, there are three turbine rotors in the turbine section, with a fan drive turbine driving a fan through the input shaft, and two other turbine rotors driving compressor rotors.

In another embodiment according to any of the previous embodiments, the carrier is fixed relative to a housing. The output shaft drives a compressor hub, and a fan at a common speed, and the input shaft is driven by a turbine rotor.

In another embodiment according to any of the previous embodiments, there are two turbine rotors, with the first turbine rotor driving a second compressor hub, and a lower pressure turbine rotor driving the compressor hub and the fan through the input shaft.

In another embodiment according to any of the previous embodiments, the carrier includes spaced apart walls with circumferentially spaced mounts interconnecting the walls. The mounts provide circumferentially spaced apart apertures between the mounts at an outer circumference of the carrier. The intermediate gears extend through the apertures to intermesh with a ring gear.

In another embodiment according to any of the previous embodiments, the lubrication passage includes a primary passage extending laterally between the walls and first and second passages in communication with the primary passage and respectively terminating near the sun gear and intermediate gears.

In another embodiment according to any of the previous embodiments, a tube extends through a hole in one of the walls, the tube in communication with the primary passage.

In another embodiment according to any of the previous embodiments, there are three turbine rotors in the turbine section, with a fan drive turbine driving a fan through the input shaft, and two other turbine rotors driving compressor rotors.

In another embodiment according to any of the previous embodiments, the carrier is fixed relative to a housing. The output shaft drives a compressor hub, and a fan at a common speed, and the input shaft is driven by a turbine rotor.

In another embodiment according to any of the previous embodiments, there are two turbine rotors, with the first turbine rotor driving a second compressor hub, and a lower pressure turbine rotor driving the compressor hub and the fan through the input shaft.

In another embodiment according to any of the previous embodiments, the carrier is fixed to a housing. The output shaft drives a fan. The input shaft rotates ng with a compressor hub.

In another embodiment according to any of the previous embodiments, there are two turbine rotors in the turbine section with a first turbine rotor driving a second compressor hub, and a lower pressure turbine rotor driving the compressor hub and the input shaft.

In another featured embodiment, a method of designing a turbine engine comprises the steps of providing an epicyclic gear train including a carrier, a sun gear and intermediate gears arranged about and intermeshing with the sun gear, the intermediate gears supported by the carrier. A baffle includes a lubrication passage near at least one of the sun gear and intermediate gears for directing a lubricant on at least one of the sun gear and intermediate gears. A compressor section and a turbine sections are provided, the turbine section to drive the compressor section and the epicyclic gear train. There are three turbine rotors in the turbine section, with a fan drive turbine driving a fan through the input shaft, and two other turbine rotors driving compressor rotors.

BRIEF DESCRIPTION OF THE DRAWINGS

FIG. 5 is an enlarged view of a portion of the epicyclic gear train shown in FIG. 2.

FIG. 6 shows another embodiment.

FIG. 7 shows another embodiment.

DETAILED DESCRIPTION

Figure 1A:
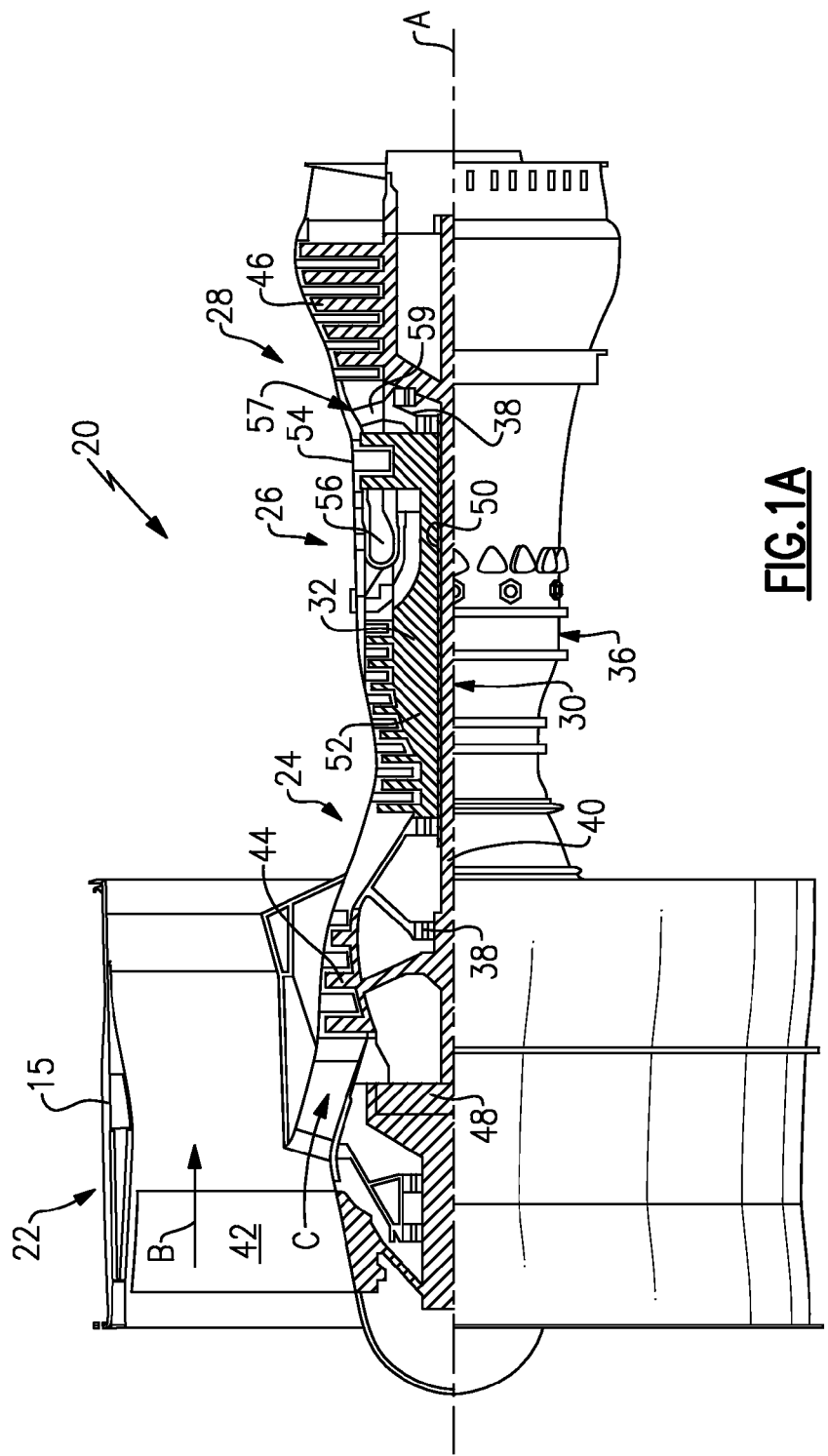
FIG. 1A is a schematic view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°R)]^{0.5}$. The "Low corrected fan tip speed" as disclosed herein according to one non-limiting embodiment is less than about 1150 ft/second.

Figure 1B:
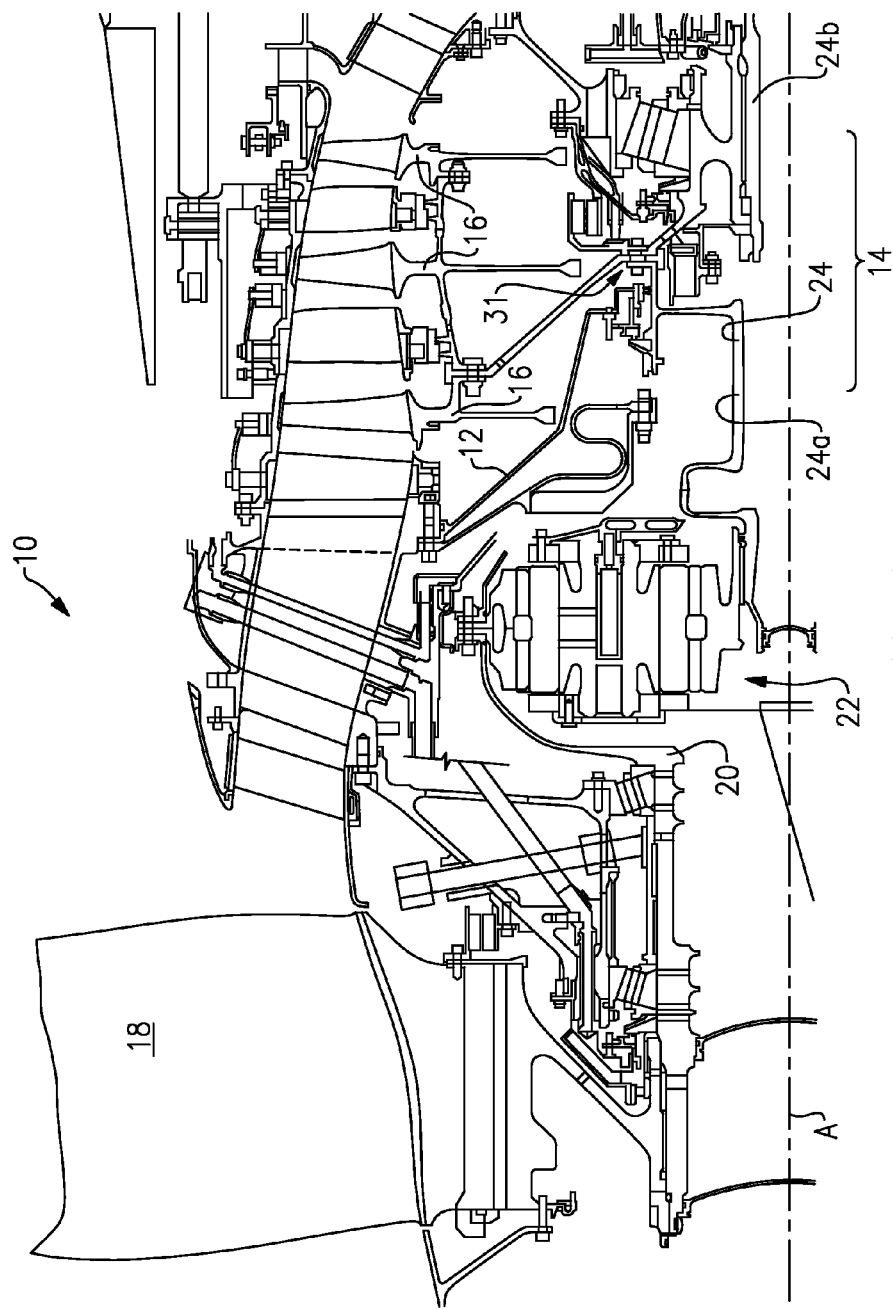
FIG. 1B is a partial cross-sectional view of a front portion of a gas turbine engine illustrating a fan, epicyclic gear train and a compressor section.

A portion of a gas turbine engine 10 is shown schematically in FIG. 1B. The turbine engine 10 includes a fixed housing 12 that is constructed from numerous pieces secured to one another. A compressor section 14 having compressor hubs 16 with blades are driven by a turbine shaft (not shown) about an axis A. A fan 18 is supported on a fan shaft 20 that is driven by a compressor shaft 24, which supports the compressor hubs 16, through an epicyclic gear train 22.

Figure 2:
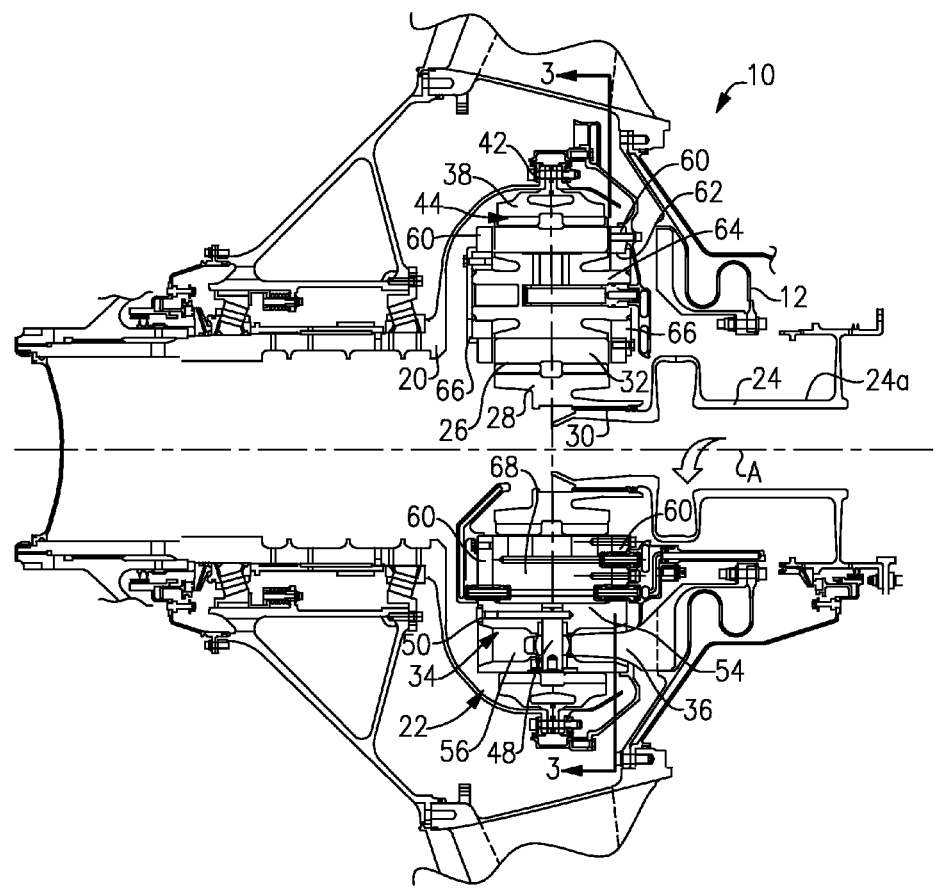
FIG. 2 is a cross-sectional view of the epicyclic gear train shown in FIG. 1.

In the example arrangement shown, the epicyclic gear train 22 is a star gear train. Of course, the claimed invention also applies to other epicyclic gear trains such as a planetary arrangement. Referring to FIG. 2, the epicyclic gear train 22 includes a sun gear 28 that is connected to the compressor shaft 24, which provides rotational input, by a splined connection 30. A carrier 34 is fixed to the housing 12 by a torque frame 36. The carrier 34 supports intermediate gears (which are star gears 32 in the arrangement shown) that are coupled to the sun gear 28 by meshed interfaces 26 between the teeth of the sun and star gears 28, 32. A ring gear 38 surrounds the carrier 34 and is coupled to the star gears 32 by meshed interfaces 44. The ring gear 38, which provides rotational output, is secured to the fan shaft 20 by connection 42.

Figure 3:
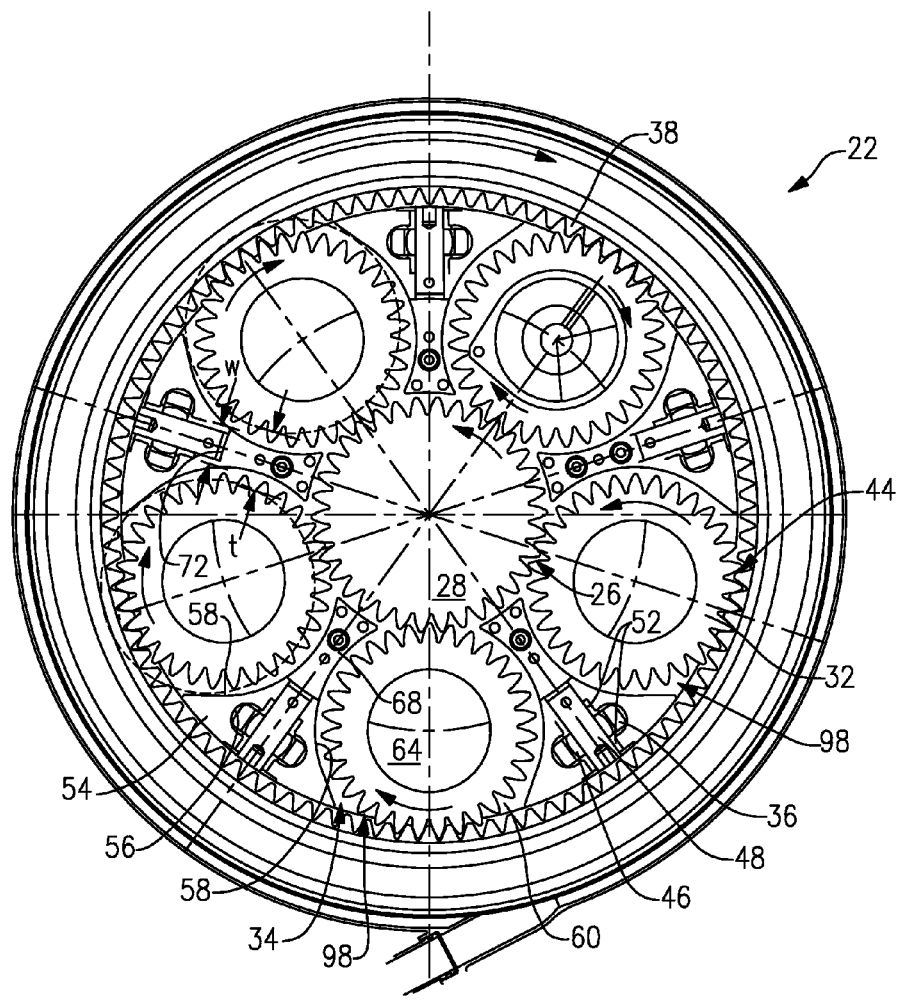
FIG. 3 is an end view of the epicyclic gear train taken along line 3-3 in FIG. 2 with a pair of star gears shown in phantom in an installation position.

In one example, the torque frame 36 grounds the carrier 34 to the housing 12 in a known manner. For example, mounts 53 have apertures 56 receiving fingers of the torque frame 36, as shown in FIGS. 2 and 3. Pins 48 that extend through spherical bearings 46 and bushings 52 secure the fingers to the carrier 34. Fasteners 50 retain the pins 48 to the carrier 34.

The carrier 34 is a unitary structure manufactured from one piece for improved structural rigidity and ease of assembly. The carrier 34 includes spaced apart side walls 60 that are interconnected by the mounts 54, which are generally wedge-shaped members, as best shown in FIG. 3. The mounts 54 and side walls 60 are unitary with one another. The mounts 54 have opposing curved surfaces 58 that are in close proximity to the star gears 32 and generally follow the curvature of the teeth of the star gears 32 so that any oil on the curved surfaces 58 will likely find its way to the star gears 32 for additional lubrication.

The mounts 54 are circumferentially spaced about the carrier 34 to provide apertures 98 through which the star gears 32 extend to engage the ring gear 38. Returning to FIG. 2, the side walls 60 include holes 62 for receiving a journal bearing 64 that supports each of the star gears 32. Each journal bearing 64 is retained within the carrier 34 by retainers 66 fastened to the side walls 60.

Figure 4:
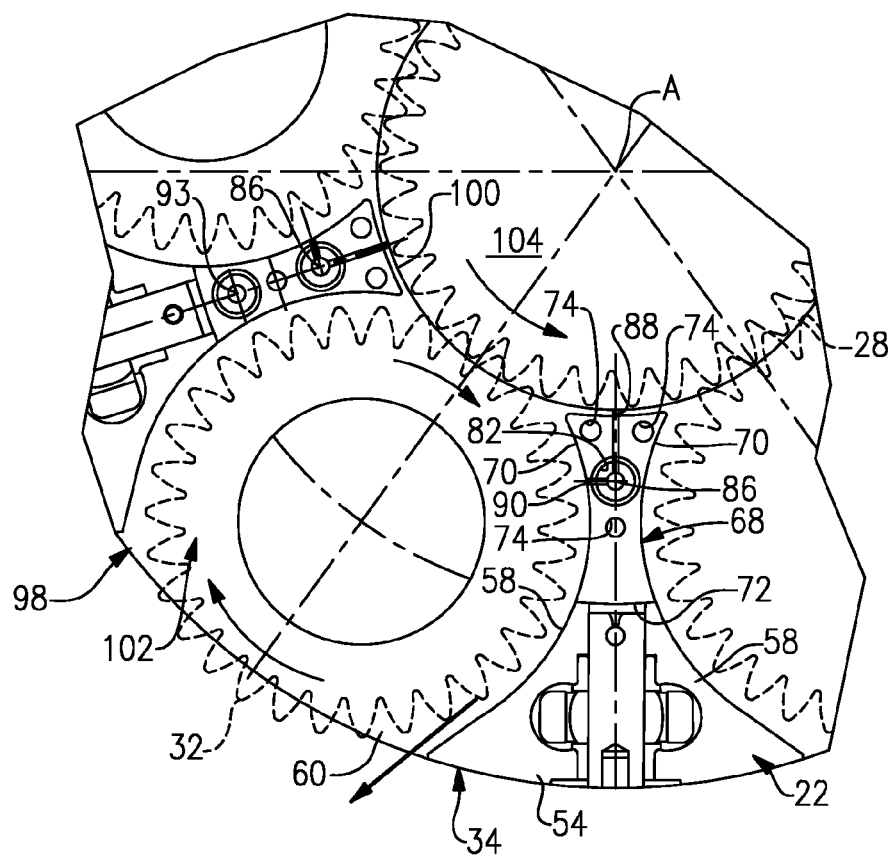
FIG. 4 is an enlarged view of a portion of the epicyclic gear train shown in FIG. 3 with a sun gear and star gears shown in phantom.

Oil baffles 68 are arranged between the side walls 60 near each of the mounts 54, best shown in FIG. 2. Referring to FIGS. 4 and 5, the baffles 68 include ends 72 that abut the mounts 54, in the example shown. The baffles 68 also include opposing curved surfaces 70 arranged in close proximity to the star gears 28. The curved surfaces 58, 70 are contiguous with and adjoin one another, in the example shown, and provide gear pockets 102 that receive the star gears 32. A gear pocket 104, which receives the sun gear 28, is also provided between a surface 73 on each of the baffles 68 opposite the ends 72.

In one example, one of the side walls 60 includes holes 74 that receive fasteners 76 which secure each of the baffles 68 to the carrier 34. The baffles 68 include a lubrication passage provided by a primary passage 86 that fluidly communicates with a lubricant distributor 78. The lubricant distributor 78 is fed oil from a lubricant supply 96. In one example, the baffles 68 include openings 82 that receive a tube 80 extending through a hole 83 in the side wall 60. Seals 84 seal the tube 80 to the opening 82 and lubricant distributor 78. Other tubes 92 having seals 84 are used to provide oil to an external spray bar 94 through another lubrication passage (spray bar passage 93 that extends through one of the baffles 68). The external spray bar 94 is secured to the carrier 34 and sprays oil in the vicinity of the sun gear 28 near the splined connection 30 (shown in FIGS. 2 and 5).

The primary passage 86 is in communication with first and second passages 88, 90 that spray oil on the teeth of the sun and star gears 28, 32. In the example shown, the first and second passages 88, 90 are arranged ninety degrees from one another.

With the example baffles 68, lubricant distribution is integrated into the baffle so that separate components are eliminated. The baffles 68 can be constructed from a different, lighter weight material than the carrier 34.

The example carrier 34 can be constructed from one piece, which improves the structural integrity of the carrier. A central opening 100 is machined in at least one of the side walls 60 and provides the gear pocket 104. Gear pockets 102 are machined between the side walls 60 and mounts 54 for each of the star gears 32 and form apertures 98 at an outer circumference of the carrier 34. Referring to FIG. 3, the star gears 32 are inserted into the central opening 100 and moved radially outwardly so that they extend through the apertures 98 and are preferably in abutment with the mounts 54 (position indicated by dashed lines in FIG. 3). In this position, there is an adequate gap, t, between the teeth of adjacent star gears 32 to accommodate a width, w, of the end 72 of the baffles 68. Once the baffles 68 have been inserted, the star gears 32 can be repositioned, as shown by the solid lines, and the sun gear 28 can be inserted into the central opening 100 so that it meshes with the star gears 32. The baffles 68 are secured to the carrier 34 using fasteners 76. The tubes 80, 92 can be inserted and the rest of the lubricant distribution system can be connected.

FIG. 6 shows an embodiment 200, wherein there is a fan drive turbine 208 driving a shaft 206 to in turn drive a fan rotor 202. A gear reduction 204 may be positioned between the fan drive turbine 208 and the fan rotor 202. This gear reduction 204 may be structured and operate like the gear reduction disclosed above. A compressor rotor 210 is driven by an intermediate pressure turbine 212, and a second stage compressor rotor 214 is driven by a turbine rotor 216. A combustion section 218 is positioned intermediate the compressor rotor 214 and the turbine section 216.

FIG. 7 shows yet another embodiment 300 wherein a fan rotor 302 and a first stage compressor 304 rotate at a common speed. The gear reduction 306 (which may be structured as disclosed above) is intermediate the compressor rotor 304 and a shaft 308 which is driven by a low pressure turbine section.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. A turbine engine comprising:
  compressor and turbine sections; and
  an epicyclic gear train including:
    a carrier;
    a sun gear and intermediate gears arranged about and intermeshing with the sun gear, the intermediate gears supported by the carrier; and
    a baffle secured to the carrier by an axially oriented fastening member, the baffle including a lubrication passage near at least one of the sun gear and intermediate gears for directing a lubricant on the at least one of the sun gear and intermediate gears.

2. The turbine engine according to claim 1, comprising a ring gear intermeshing with the intermediate gears and an output shaft interconnected to the ring gear, and an input shaft interconnected to the sun gear.

3. The turbine engine according to claim 2, wherein the carrier is fixed relative to a housing, the output shaft drives a fan, and the input shaft supports a compressor hub having compressor blades.

4. The turbine engine according to claim 2, wherein there are three turbine rotors in the turbine section, with a fan drive turbine driving the fan through the input shaft, and two other turbine rotors driving compressor rotors.

5. The turbine engine according to claim 2, wherein the carrier is fixed relative to a housing, the output shaft drives a compressor hub, and a fan at a common speed, and the input shaft is driven by a turbine rotor.

6. The turbine engine according to claim 5, wherein there are two turbine rotors, with the first turbine rotor driving a second compressor hub, and a lower pressure turbine rotor driving the compressor hub and the fan through the input shaft.

7. The turbine engine according to claim 2, wherein the carrier is fixed to a housing, and the output shaft drives a fan, with the input shaft rotating with a compressor hub.

8. The turbine engine according to claim 1, wherein the carrier includes spaced apart walls with circumferentially spaced mounts interconnecting the walls, the mounts providing circumferentially spaced apart apertures between the mounts at an outer circumference of the carrier, the intermediate gears extending through the apertures to intermesh with a ring gear.

9. The turbine engine according to claim 8, comprising a housing supporting a torque frame that is secured to the mounts.

10. The turbine engine according to claim 8, wherein the lubrication passage includes a primary passage extending laterally between the walls and first and second passages in communication with the primary passage and respectively terminating near the sun gear and intermediate gears.

11. The turbine engine according to claim 10, comprising a tube extending through a hole in one of the walls, the tube in communication with the primary passage.

12. The turbine engine according to claim 1, wherein there are three turbine rotors in the turbine section, with a fan drive turbine driving a fan through the input shaft, and two other turbine rotors driving compressor rotors.

13. The turbine engine according to claim 1, wherein the carrier is fixed relative to a housing, the output shaft drives a compressor hub and a fan at a common speed, and the input shaft is driven by a turbine rotor.

14. The turbine engine according to claim 2, wherein the carrier is fixed to a housing, and the output shaft drives a fan, with the input shaft rotating with a compressor hub.

15. The turbine engine according to claim 14, wherein there are two turbine rotors in the turbine section with a first turbine rotor driving a second compressor hub, and a lower pressure turbine rotor driving the compressor hub and the input shaft.

16. A turbine engine comprising:
  compressor and turbine sections; and
  an epicyclic gear train including:
    a carrier;
    a sun gear and intermediate gears arranged about and intermeshing with the sun gear, the intermediate gears supported by the carrier;
    a baffle secured to the carrier by an axially oriented fastening member, the baffle including a lubrication passage near at least one of the sun gear and intermediate gears for directing a lubricant on the at least one of the sun gear and intermediate gears; and a spray bar external to the carrier and in communication with the lubrication passage, the spray bar terminating near the sun gear for directing lubricant on the sun gear.

17. The turbine engine according to claim 16, comprising a ring gear intermeshing with the intermediate gears and an output shaft interconnected to the ring gear, and an input shaft interconnected to the sun gear.

18. The turbine engine according to claim 17, wherein the carrier is fixed relative to a housing, the output shaft drives a fan, and the input shaft supports a compressor hub having compressor blades.

19. The turbine engine according to claim 17, wherein there are three turbine rotors in the turbine section, with a fan drive turbine driving a fan through the input shaft, and two other turbine rotors driving compressor rotors.

20. The turbine engine according to claim 17, wherein the carrier is fixed relative to a housing, the output shaft drives a compressor hub, and a fan at a common speed, and the input shaft is driven by a turbine rotor.

21. The turbine engine according to claim 20, wherein there are two turbine rotors, with the first turbine rotor driving a second compressor hub, and a lower pressure turbine rotor driving the compressor hub and the fan through the input shaft.

22. The turbine engine according to claim 16, wherein the carrier includes spaced apart walls with circumferentially spaced mounts interconnecting the walls, the mounts providing circumferentially spaced apart apertures between the mounts at an outer circumference of the carrier, the intermediate gears extending through the apertures to intermesh with a ring gear.

23. The turbine engine according to claim 22, wherein the lubrication passage includes a primary passage extending laterally between the walls and first and second passages in communication with the primary passage and respectively terminating near the sun gear and intermediate gears.

24. The turbine engine according to claim 19, comprising a tube extending through a hole in one of the walls, the tube in communication with the primary passage.

25. The turbine engine according to claim 16, wherein there are three turbine rotors in the turbine section, with a fan drive turbine driving a fan through the input shaft, and two other turbine rotors driving compressor rotors.

26. The turbine engine according to claim 16, wherein the carrier is fixed relative to a housing, the output shaft drives a compressor hub, and a fan at a common speed, and the input shaft is driven by a turbine rotor.

27. The turbine engine according to claim 26, wherein there are two turbine rotors, with the first turbine rotor driving a second compressor hub, and a lower pressure turbine rotor driving the compressor hub and the fan through the input shaft.

28. The turbine engine according to claim 16, wherein the carrier is fixed to a housing, and the output shaft drives a fan, with the input shaft rotating with a compressor hub.

29. The turbine engine according to claim 28, wherein there are two turbine rotors in the turbine section with a first turbine rotor driving a second compressor hub, and a lower pressure turbine rotor driving the compressor hub and the input shaft.

30. A method of designing a turbine engine comprising:
providing an epicyclic gear train including:
a carrier;
a sun gear and intermediate gears arranged about and intermeshing with the sun gear, the intermediate gears supported by the carrier; and
a baffle secured to the carrier by an axially oriented fastening member, the baffle including a lubrication passage near at least one of the sun gear and intermediate gears for directing a lubricant on the at least one of the sun gear and intermediate gears; and
providing a compressor section and a turbine sections, the turbine section to drive the compressor section and the epicyclic gear train,
wherein there are three turbine rotors in the turbine section, with a fan drive turbine driving a fan through the input shaft, and two other turbine rotors driving compressor rotors.

* * * * *